United States Patent [19]

Hoffstetter et al.

[11] Patent Number: 5,045,148

[45] Date of Patent: Sep. 3, 1991

[54] ARTICLE ATTACHING APPARATUS

[75] Inventors: Armand C. L. Hoffstetter, Town & Country; Ronald L. Schilling, Florissant, both of Mo.

[73] Assignee: GA-Vehren Engineering Co., St. Louis, Mo.

[21] Appl. No.: 237,303

[22] Filed: Aug. 26, 1988

Related U.S. Application Data

[63] Continuation-in-part of Ser. No. 919,193, Oct. 15, 1986, abandoned.

[51] Int. Cl.[5] .......... B65H 1/00; B23Q 7/02

[52] U.S. Cl. .......... 156/567; 156/556; 156/566; 156/569; 221/277

[58] Field of Search .......... 156/566, 567, 556, 571, 156/DIG. 2, 285, DIG. 38, 569, 563, 552; 221/217, 277

[56] References Cited

U.S. PATENT DOCUMENTS

| | | | |
|---|---|---|---|
| 2,788,150 | 4/1957 | Rose | 156/DIG. 38 |
| 2,878,953 | 3/1959 | Mitchell | 156/571 X |
| 2,967,636 | 1/1961 | Manas et al. | 156/571 |
| 4,203,793 | 5/1980 | Yamashita | 156/571 X |
| 4,203,798 | 5/1980 | Yamashita | 156/567 |
| 4,256,528 | 3/1981 | Patterson | 156/567 X |
| 4,319,948 | 3/1982 | Volkert | 156/566 |
| 4,411,727 | 10/1983 | Seiy | 156/567 |
| 4,584,046 | 4/1986 | Geyssel | 156/567 X |
| 4,641,772 | 2/1987 | Skuthan | 227/123 |

*Primary Examiner*—Michael W. Ball
*Assistant Examiner*—Michele K. Yoder
*Attorney, Agent, or Firm*—Cohn, Powell & Hind

[57] ABSTRACT

This article attaching apparatus (10) for attaching a coin or similar object (38) to each of a sequence of continuously moving carrying sheets (14) includes a vacuum belt conveyor (24) for transporting the carrying sheets through a gumming station (26), where said sheets are provided with an adhesive area (34), to a location below a coin storage assembly (81). The coin storage assembly includes a feed tube (142) from which an individual coin is deposited onto the carrying sheet adhesive patch without interruption of the forward movement of the carrying sheet (14) by a feed wheel assembly (80) the feed assembly being mounted to a support frame (60) and disposed between the coin storage assembly and the carrying sheet. The feed wheel assembly includes a rotatable feed wheel (102) having opposed inserts (122, 124) each provided with a circumferentially disposed coin-receiving groove (134). The feed wheel is sequentially supplied with vacuum pressure and positive pressure from an air supply unit (114), which includes a stationary air valve (150), so that the coin is picked up under vacuum pressure from the coin tube and held during rotation to the deposit point where it is momentarily subjected to positive pressure to facilitate deposit. A spring-loaded anti-jamming device 220 is provided adjacent a cut-away portion (232) at the lower end of the coin tube.

14 Claims, 4 Drawing Sheets

204
204
190
216
206
142
202
218
212
214
200
198
201
204
190
4
H
38
208
211
142
200
81
201
210
206
198
212
202
218
216
4
214
202
198
36
206
200
190
224
226
222
72
194
192
228
238
72
192
70
60
38
74

32
30
220
5
78
76
66
122
80
126
128
132
133
68
88
82
100
86
90
120
106
92
84
64
88
128
126
132
124
32
14
46
14
5
48
12
52
54
50
24
133
38
134

ARTICLE ATTACHING APPARATUS

This is a continuation in part of copending application Ser. No. 06/919,193 filed on Oct. 15, 1986 now abandoned.

BACKGROUND OF THE INVENTION

This invention relates generally to continuous delivery sheet processing machines and particularly to a deposit apparatus forming an integral part of such a machine which provides that articles such as coins, medallions, or the like, are sequentially deposited at intervals onto carrying sheet blanks, or the like, continuously conveyed by the machine.

Machines are known in the prior art which are used for attaching items such as credit cards onto carrying sheets. Such machines are generally slow, having an output of about one hundred attachments per minute, because they rely on intermittent motion for the conveyor which transports the carrying sheet. In addition, such machines are generally complicated because the carrying sheets must be provided with corner receiving slits into which the cards must be fitted.

An improved card attachment apparatus commonly owned by the assignee of the present invention overcomes these problems with respect to the deposit of articles such as credit cards. This card attachment apparatus employs a reciprocating mechanism which is engageable with the underside of the lowermost card to urge the card forwardly into a belt conveyor system for deposit onto the carrying sheet conveyor. However, there is a need for the attachment of articles other than cards, such as coins, medallions and the like which is not supplied by said aforementioned card attaching apparatus.

The present article attachment apparatus overcomes these and other problems in a manner not disclosed in the known prior art.

SUMMARY OF THE INVENTION

The attaching apparatus is used in connection with a continuous delivery sheet processing machine to provide accurate deposit and alignment of coins, or the like, onto continuously moving carrying sheets, or the like.

With this attachment apparatus the coins can be attached to the carrying sheets at a rate of three to five hundred attachments per minute. Also, the attachment apparatus is provided with multiple adjustment features which permit accurate attachment of coins, medallions or other articles of various sizes, at various carrying sheet spacing and at precise locations on the carrying sheet.

The apparatus includes conveyor means for continuously transporting the carrying sheets; means for applying an adhesive area to each sheet; means for storing a plurality of articles, such as coins, in a stack above the sheet conveyor means; feed wheel means disposed between the stack of articles and the conveyor means and having means receiving an article from the lower end of the stack, retaining said article in place during rotation and depositing said article onto said adhesive area and drive means for said feed wheel means and said deposit means.

It is an aspect of this invention to provide that the feed wheel means includes a generally cylindrical surface and said receiving means includes an arcuate groove formed in said surface and having a forward end and a rearward end, said rearward end defining a stop; it is another aspect to provide that the groove includes a counterbored hole defining said stop, and the retaining means includes vacuum means applying a suction to the counterbored hole to hold the article in place, and still another aspect to provide that the depositing means includes pressure means momentarily applying a pressure to the counterbored hole to urge the article out of place.

Yet another aspect of this invention is to provide that the feed wheel means includes at least one removable insert having the arcuate surface; it is another aspect to provide that the removable insert is adapted to receive a particular article, said insert being replaceable by a different insert adapted to receive a different article; it is another aspect to provide that said groove is tapered between the forward and rearward end and includes a feathered forward end, and still another aspect is to provide at least two identical and diametrically opposed inserts for the feed wheel means.

It is another aspect of this invention to provide that the feed wheel means includes an air supply means providing said vacuum means and said pressure means and an air valve means controlling said vacuum means and said pressure means.

It is another aspect of this invention to provide that the feed wheel means includes a shaft, a feed wheel mounted to the shaft and having a rotatable face with an opening, and passage means communicating between said opening and said counterbored hole, and to provide that the air valve means is mounted to the shaft in stationary relationship to the feed wheel and includes an elongate arcuate passage connected to a vacuum source and intermittently connected to the opening in the feed wheel face, and to provide a smaller passage connected to a pressure source and momentarily connected to the opening in the feed wheel face and it is another aspect to provide that the elongate arcuate passage is substantially semi-circular and the smaller passage is disposed in spaced relation from the end of said elongate passage at the same radius.

It is yet another aspect of this invention to provide that the conveyor means includes a table having opposed support members, the drive means includes a transverse drive shaft carried by the support members, and to provide a support frame mounted to the drive shaft and including opposed side members and at least one cross member interconnecting the side members, and to provide that said feed wheel means and said storage means are carried by said support means.

Another aspect of this invention is to provide that said feed wheel means includes a shaft carried by said support frame side members, and to provide that said side members are mounted to the drive shaft in swingable relation to provide adjustment of the feed wheel means relative to the conveyor means.

Another aspect of this invention is to provide that said storage means includes an article storage tube and a storage frame, said storage frame including opposed side members and vertically spaced members connected between said side members, said spaced members being adapted to receive said storage tube in removable relation, and yet another aspect to provide that said storage frame spaced members include a removable inner portion adapted to receive said storage tube and being replaceable by a different inner portion adapted to receive a different storage tube.

It is an aspect of this invention to provide that said article storage tube includes a lower end disposed adjacent the rotatable feed wheel means, said tube lower end including an arcuate cutout portion, and to provide that a pivoted resilient arm is mounted to said storage tube having a lower end, in part substituting for the tube cutout portion, said arm being movable outwardly from said tube to provide an anti-jamming device.

It is an aspect of this invention to provide an apparatus for attaching an article such as a coin to a moving sheet, which is relatively simple and inexpensive to manufacture and yet easy to operate.

DESCRIPTION OF THE PREFERRED EMBODIMENT

Figure 12:
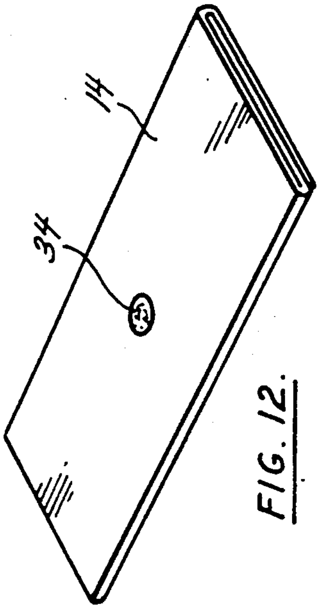
FIG. 12 is a perspective view of the carrying sheet showing the application of adhesive thereto.
Figure 1:
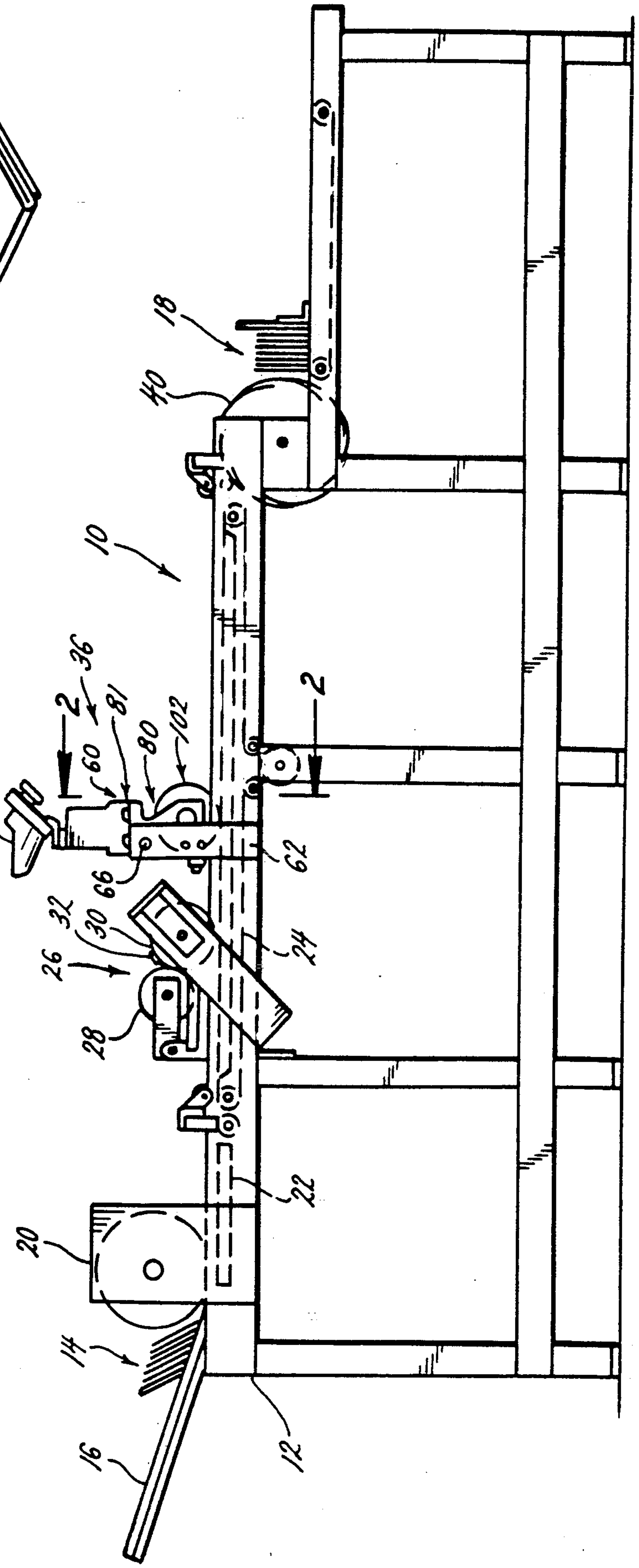
FIG. 1 is an elevational view, reduced in size, of the article attaching apparatus.

Referring now by reference numerals to the drawings and first to FIG. 1 it will be understood that the article attachment apparatus 10 includes a table 12 providing a support base for a conveyor system, which provides a means for transporting a plurality of carrying sheets 14 from a storage station 16 to a collection station 18. During passage between these stations each carrying sheet 14 is removed from the stack of carrying sheets 14 by a rotary conveyor 20 and passed onto an adjustable position push-type pin conveyor 22, such as that illustrated in commonly owned U.S. Pat. No. 4,549,729, which is incorporated herein by reference and which separates and sequences the sheets and passes them onto an upstream portion of the vacuum belt conveyor 24. The vacuum belt conveys the sheets 14 forwardly and below a gumming station 26 consisting of a gumming roll 28 and an applicator roll 30. The applicator roll 30 includes circumferentially disposed gum applicators 32 which receive a coating of adhesive from the applicator roll 30 and apply said coating in the form of an adhesive area or patch 34 (see FIG. 12) which can be gum dots or other arrangements suitable for mounting an article to each carrying sheet 14 as it passes below the applicator roll. It will be understood that the articles to be deposited can be virtually any article such as coins, medallions, keys or similar flat or disc-like articles. However, for the purpose of the description herein it will be presumed that the articles are coins.

Figure 13:
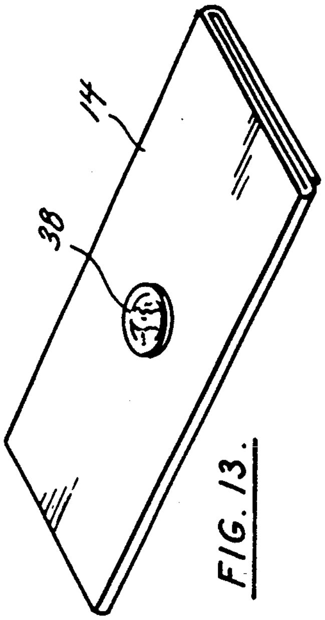
FIG. 13 is a similar view to FIG. 12 showing the article emplacement on the carrying sheet.
Figures 3, 4:
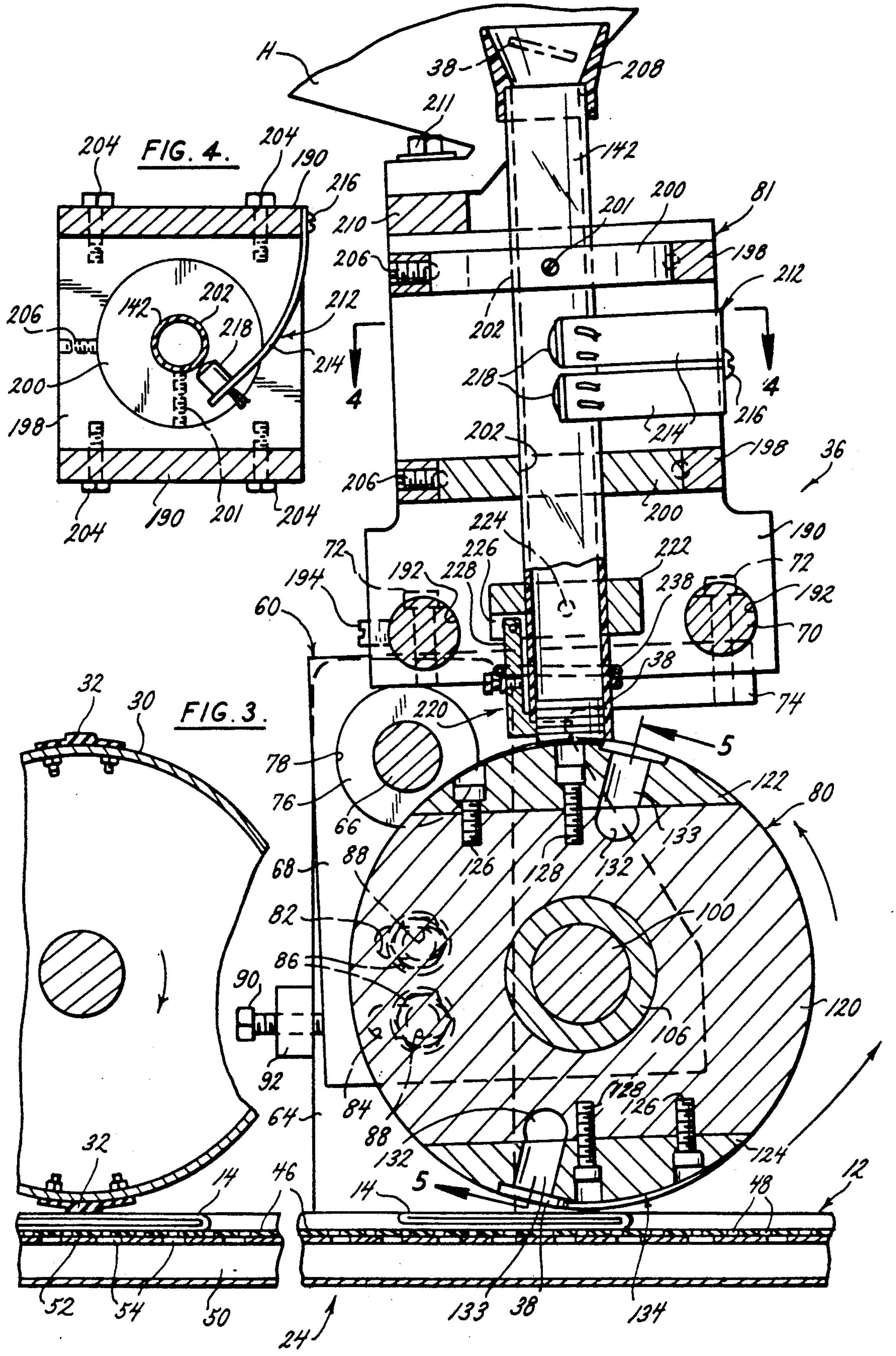
FIG. 3 is an enlarged cross-sectional view taken on line 3—3 of FIG. 2 showing the pick-up and deposit of articles at different points on the feed wheel.
FIG. 4 is a sectional plan view, reduced in size, taken on line 4—4 of FIG. 3.

As shown in FIGS. 1 and 3, the adhesive coated carrying sheet 14, following the application of the adhesive patch 34, passes beneath a coin storage and deposit station 36 where a coin, indicated by numeral 38, is deposited from a stack of such coins 38 onto the adhesive patch 34 of each carrying sheet 14 (see FIG. 13). Following attachment, the carrying sheet 14 and its attached coin 38 are conveyed to a rotary conveyor 40 by a downstream portion of the vacuum belt conveyor 24 and are delivered by said rotary conveyor to the collection station 18. The coin storage and deposit station 36 will now be more particularly described with reference to FIGS. 2-11 and first to FIGS. 2 and 3.

The carrying sheets 14 are maintained in position as they pass beneath the applicator 32 and through the coin deposit station 36 by the vacuum belt conveyor 24. This conveyor 24 is conventional in that it includes a relatively wide perforated conveyor belt 46 having a plurality of relatively small openings 48. The belt 46 moves in sliding relation above an air duct 50 having an upper wall 52 perforated with relatively large openings 54. Vacuum pressure in the duct 50 provides the necessary suction to hold the carrying sheet in place as it travels downstream on the conveyor 24.

The coin storage and deposit station assembly 36 includes a support frame generally indicated by numeral 60 which is mounted between opposed substantially vertical support members 62 and 64 which are fixedly attached to the table 12 as by fasteners (not shown), and carry a drive shaft 66 to which the support frame 60 is mounted, said support member being apertured to receive said shaft. The support frame 60, which provides a mounting for a feed wheel assembly 80 and a coin storage assembly 81 includes a pair of side plates 68 interconnected by a pair of elongate cross bars 70 attached to said side plates by fasteners 72. The side plates 68, as best shown in FIG. 3, are cut away to provide an upper outstanding arm portion 74, which extends forwardly to receive one of the cross bars 70. The drive shaft 66 includes bearings 76 at each end and the side plates 68, as shown in FIG. 3, are apertured at 78 to receive said bearings. This arrangement provides that the support frame 60, and the feed wheel assembly 80 mounted thereto, are swingably adjustable about the axis of rotation of the drive shaft 66. The adjustment is facilitated by the provision of arcuate slots 82 and 84 in each support member 62 and 64, which receive clamping bolts 86 received in threaded openings 88 provided in each side plate 68. Adjustment is effectuated by virtue of adjustment bolts 90 which are tapped into a block 92, attached as by welding to each support member 62 and 64, and overlappingly related to the side plates 68 so that the adjustment bolts are positioned to engage said side plates.

Figure 2:
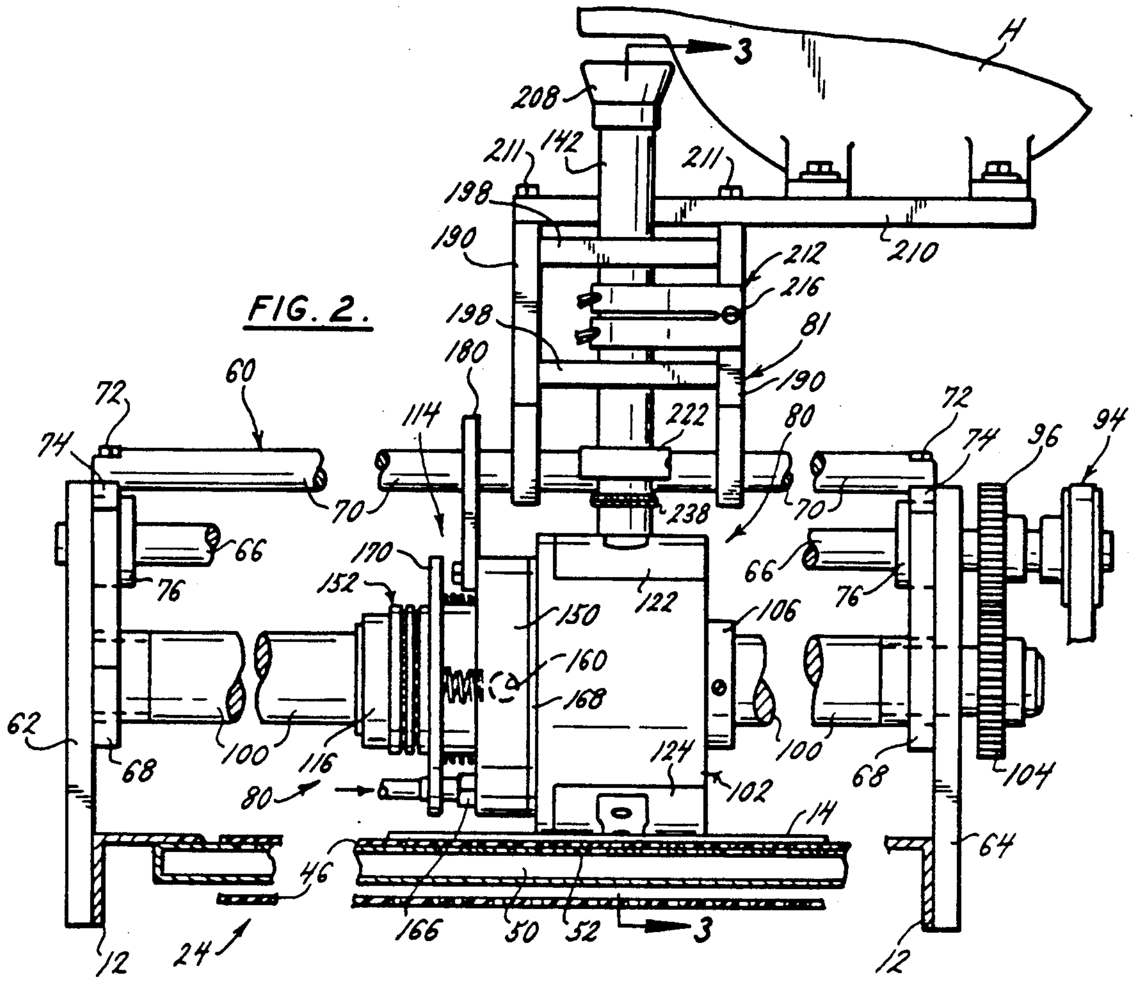
FIG. 2 is an end elevational view of the apparatus taken on line 2—2 of FIG. 1.

The drive shaft 66 extends outwardly of support member 64 and is driven by a pulley and belt drive assembly generally indicated by numeral 94 in FIG. 2. The drive shaft is provided with a drive gear 96 which drives the feed wheel assembly 80 which will now be described.

Figure 5:
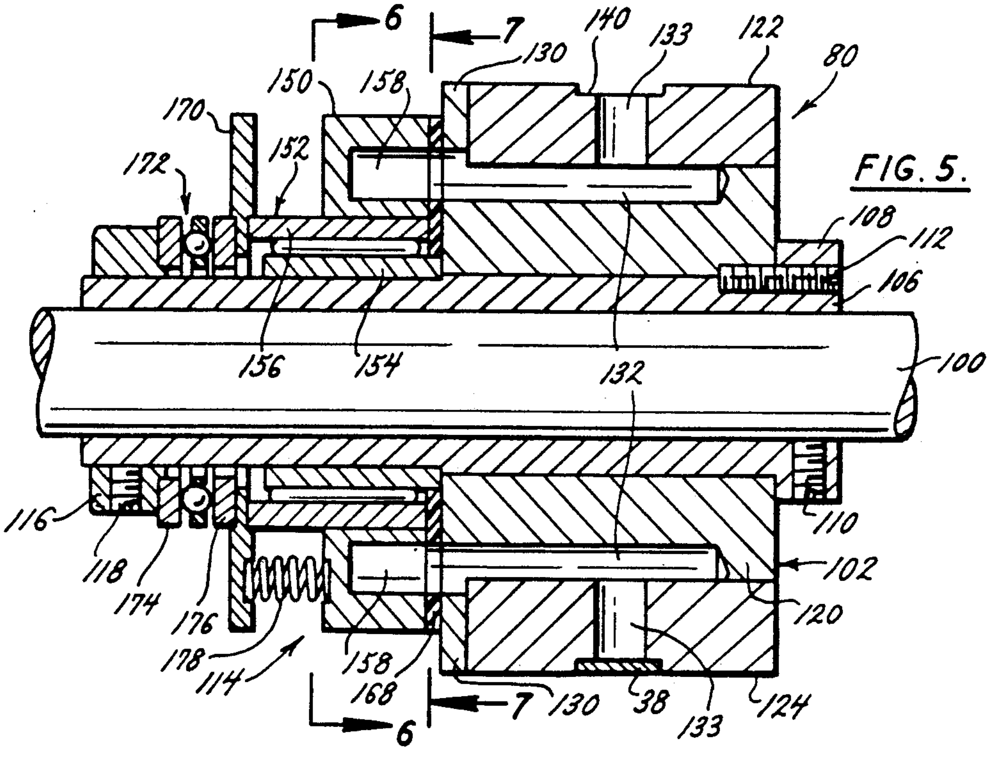
FIG. 5 is an enlarged sectional view taken on the rotational axis of the rotary conveyor.

The feed wheel assembly 80 includes a shaft 100 which is mounted between side plates 68 and carries a coin feed wheel 102. A driven gear 104 is mounted to one end of shaft 100 in drive relation to drive gear 96 and provides the means of rotating the feed wheel 102. As best shown in FIG. 5 the feed wheel 102, which is generally cylindrical, is mounted indirectly to the shaft 100 through the medium of an adjustable sleeve 106. The sleeve 106 includes an enlarged head 108 and is attached to the shaft 100 and to the feed wheel 102 by means of set screws 110 and 112 respectively.

The feed wheel assembly 80 includes an air supply unit generally indicated by 114, which is also mounted to the sleeve 106 and which supplies vacuum air and pressurized air to the feed wheel 102. The feed wheel unit 102 and the air supply unit 114 are held in place on the sleeve 106 by means of a collar 116 provided with a set screw 118. These two units and the coin storage assembly 81 will now be described in greater detail.

Figure 11:
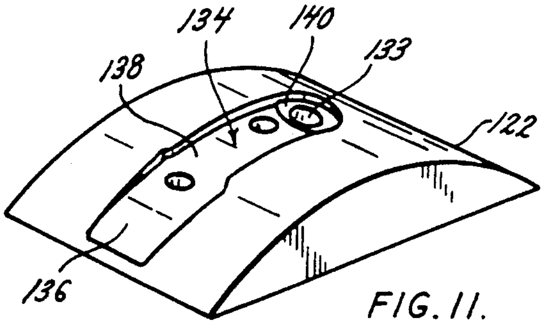
FIG. 11 is a perspective view of the feed wheel insert.

As shown in FIGS. 3 and 5 the feed wheel 102 includes a generally cylindrical body 120 having segmental portions removed to receive a pair of opposed segmental inserts 122 and 124 which are essentially identical and are threadedly attached to the body 120 by fasteners 126 and 128 by virtue of counterbored holes in the inserts and threaded holes in the body 120. The body 120 includes abutment portions 130 against which the inserts are positioned and diametrically opposed passages 132 parallel with the axis of rotation of the body 120. The inserts 122 and 124 each include radial passages 133, which are diametrically opposite, and which communicate with passages 132 and with tapered grooves 134 provided in the arcuate surface of each insert, as best shown in FIG. 11. The grooves 134 include a widened outer or entrance end 136, a narrowed intermediate portion 138 and a counterbored inner end 140 sized to suit the coin 38 to be deposited from the coin tube 142 coin storage assembly 81. The coin 38 is received into the tapered groove 134 as the groove feathered entrance end 136 passes the lower end of the coin tube 142 and, because of the stop provided by the rear end of the counterbored inner end 140, is carried by the feed wheel 102 in a counterclockwise direction as viewed in FIG. 3. The coin 38 is held in place in the inner end of the groove 134 by means of a vacuum supplied intermittently to passages 132 and 133 from the air supply unit 114 during approximately one hundred and eighty degrees (180°) of rotation. At the lower end the coin is deposited by means of a pressure jet momentarily supplied to the appropriate passages 132 and 133 from the air supply unit 114 which will now be described.

Figure 6:
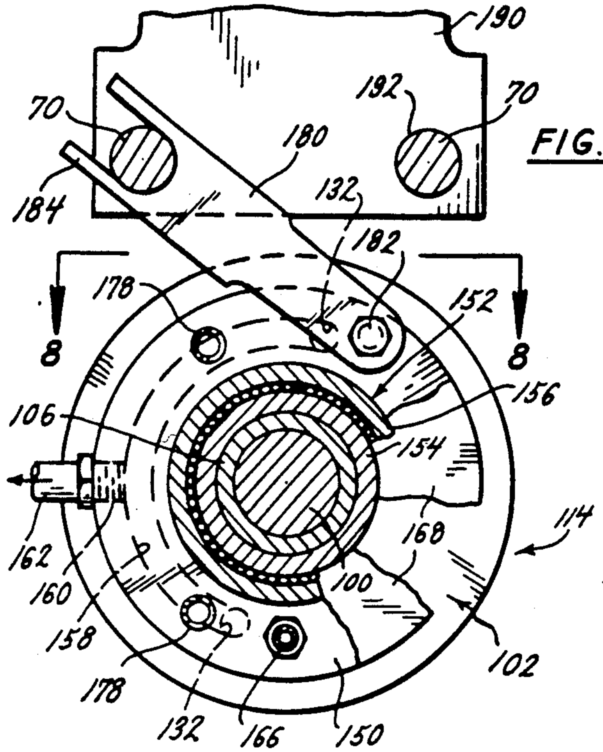
FIG. 6 is a cross-sectional view taken on line 6—6 of FIG. 5.
Figure 7:
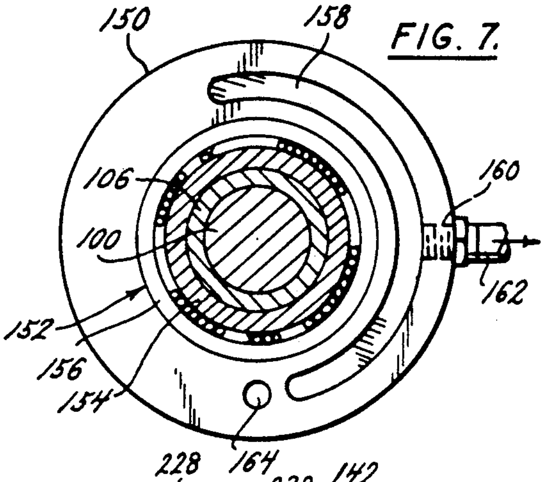
FIG. 7 is a cross-sectional view taken on line 7—7 of FIG. 5.
Figure 8:
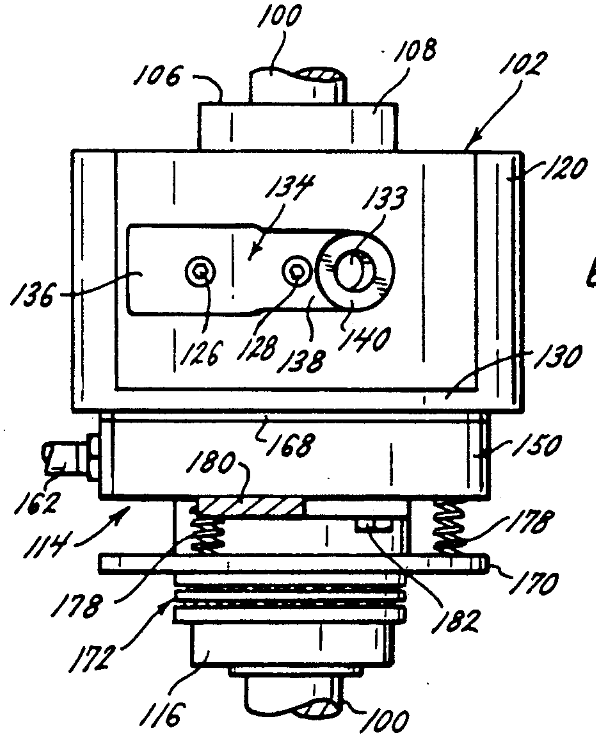
FIG. 8 is a fragmentary plan view taken on line 8—8 of FIG. 6.

As shown in FIGS. 6–8 the air supply unit 114 includes a circular air valve member 150 which is mounted to the sleeve 106 in stationary relation to said sleeve by means of a needle bearing 152 having an inner portion 154 attached to said sleeve and rotatable with it, and an outer portion 156 axially slidably mounted to said valve member 150. As shown in FIG. 7, the valve 150 includes an elongate substantially semi-circular passage 158, which communicates with a radial passage 160 having a vacuum fitting 162 attached thereto and also intermittently communicates with the passages 132 in the feed wheel 102 depending on the location of said feed wheel. The valve 150 also includes a transverse circular passage 164 which communicates with a pressure fitting 166 and also intermittently communicates with the passages 132 in the feed wheel 102 depending on the location of said feed wheel. The stationary valve member 150 is sealed from the rotating feed wheel 102 by means of an annular gasket 168 which is attached to the adjacent face of said feed wheel, as by adhesive, and which, in the embodiment shown, is formed from synthetic material such as that manufactured under the trademark RULON, a resinous powder The valve 150 is maintained in position against said gasket 168 by means of a thrust disc 170 which is sandwiched between needle bearing outer portion 156 and a thrust bearing 172. The thrust bearing 172 includes an outer portion 174, bearing against the collar 116, and an inner portion 176, bearing against the thrust disc 170. A plurality of springs 178, three (3) in number in the embodiment shown, are provided between the thrust disc 170 and the valve 150 tending to urge the valve into sealing relation against the gasket 168.

As shown in FIG. 6, the valve member 150 is held against rotation in a counterclockwise direction by means of a link 180 having its inner end connected by pivot bolt 182 to the valve member 150 and its outer bifurcated end 184 straddling and engaging left cross bar member 70.

As shown in FIGS. 3 and 4 the coin storage assembly 81 is carried by the support members 64 and includes side plates 190 provided with apertures 192 receiving said support members said side members being attached to said support members by set screws 194. The coin storage assembly also includes upper and lower spacer plates 198, which are bored to receive replaceable feed tube guide members 200. The guide members 200 are centrally apertured at 202 to receive the coin tube 142 held in place by set screws 201 The guide members 200 can be replaced by other guide members centrally apertured to receive a different coin tube. As shown in FIGS. 3 and 4 the spacer plates 198 are connected to side plates 190 by threaded fasteners 204 and guide members 200 are held in place by set screws 206. At its upper end the coin tube 142 is provided with a funnel member 208, which receives coins 38 from a coin hopper H. As shown in FIG. 3, a mounting bar 210 is provided between side plates 190 and attached thereto, as by fasteners 211 to provide a means of attaching the hopper H in an appropriate coin feed position adjacent the funnel member 208.

As also shown in FIGS. 3 and 4 the coin storage assembly 81 includes a coin sensing means 212 which indicates the height of coins in the coin tube 142. In the embodiment shown, the sensing means includes a bifurcated leaf spring 214 attached to one of the side plates 190, as by fasteners 216, each bifurcated leg having a sensing member 218 attached thereto adjacent the coin tube 142.

Figure 9:
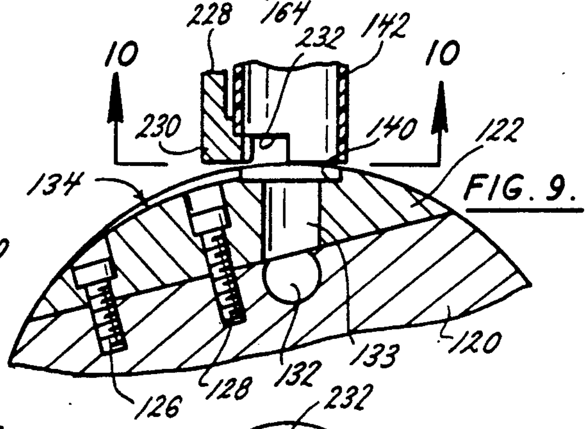
FIG. 9 is a fragmentary cross-sectional view, similar to FIG. 3, showing the spring-loaded anti-jamming mechanism.
Figure 10:
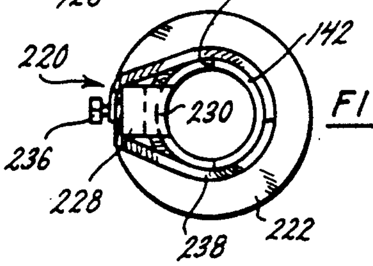
FIG. 10 is a sectional plan view taken on line 10—10 of FIG. 9.

As shown in FIGS. 3, 9 and 10 the coin storage assembly 81 also includes an anti-jamming device generally indicated by numeral 220. In the embodiment shown, the device 220 includes a collar 222 attached to the coin tube 142 as by a set screw 224. The collar 222 includes a cut-out portion 226 for receiving an L-shaped arm 228 in pivotal relation. The lower end 230 of the arm 228 is disposed adjacent a semi-circular cut-out 232, at the end of the tube 142, and is configurated to substitute, at least in part, for the removed tube material of the cut-out 232. The lower end 230 includes an abutment 234 bearing against the tube side wall, and a lightweight spring member 238 surrounding the tube 142 is attached to the member 230 by fastener 236. This arrangement provides that if, for example, a coin 38 to be picked up is inadvertently angled in the tube 142 it will not destroy the end of the coin tube 142 but will push out the arm 228.

It is thought that the structural features and functional advantages of this coin attachment apparatus have become fully apparent from the foregoing description of parts, but for completeness of disclosure, the operation of the deposit assembly will be briefly described.

The carrying sheets which are typically triple folded eight and one half inches (8 ½") by eleven inches (11") original size are passed through the gumming station at a spacing of nine inches (9") and at a rate of three to five hundred sheets per minute. The deposit mechanism is timed to cause the coins 38 to be deposited at exactly the same rate so that they are deposited on the carrying sheet in the exact position above the adhesive patch. The diameter of the wheel is such as to provide a semi-circumference of nine inches (9") between diametrically opposite coins.

The structural arrangement of parts of the feed wheel assembly 80 is such that it can accommodate a variety of sizes of coins or other similar articles. Typical coins are the U.S. five cent piece (5¢) and the United Kingdom new penny (1P). This is due to the provision of removable and replaceable inserts 122 and 124, which have grooves 134 adapted to suit the particular coin, and also to the provision of removable and replaceable feed tube guide members 200 adapted to suit the particular coin tube. The use of air valve member 150, with the semi-circular passage 158, in combination with the appropriate one of the diametrically opposed passages 132 of the feed wheel 102 and the associated passage 133 of the insert 122 ensures that a coin is securely held by suction from the time of entering the counterbored portion of the groove 134 until it is on the point of release, said release being facilitated by a momentary substitution of a pressure force received by the appropriate passage 132 from the pressure passage 164. The space between coin 38 and the carrying sheet 14, at the point of deposit of said coin can be adjusted to suit coins of different thickness and carrying sheets of different thickness by swinging the frame assembly 60 about the drive shaft 66. This is accomplished by the simple expedient of rotating adjustment bolts 90 provided on each of the support members 62 and 64. Also, if desired, a blank insert (not shown) can be substituted for insert 124, for example, so that the coins are deposited at eighteen inches (18") instead of nine inches (9").

Having described the invention in detail, those skilled in the art will appreciate that modifications may be made without departing from its spirit. Therefore, it is not intended that the scope of the invention be limited to the specific embodiments illustrated and described. Rather, it is intended that the scope of this invention be determined by the appended claims and their equivalents.

I claim as my invention:

1. A high speed apparatus for attaching articles to each of a sequence of longitudinally moving sheets, the apparatus comprising:

(a) conveyor means for continuously transporting the sheets, (b) adhesive means for applying an adhesive area to each sheet as it is being transported, (c) storage means holding a plurality of articles in a stack above the conveyor means, the storage means having a top end adapted to receive articles, and a bottom end adapted to release them, (d) a rotatable feed wheel means disposed between the article storage means and the conveyor means and adapted to rotate rapidly therebetween and having a cylindrical surface adjacent the bottom end of the article storage means and with a portion of that cylindrical surface holding articles in the storage means while continuously passing beneath the article release bottom end of the storage means, (e) a groove substantially the width of the article, formed substantially as an arc of the cylindrical surface, the groove having a feathered forward open end and a rearward closed end, in the direction of rotation, passing beneath the article release bottom end of the article storage means, the groove being tapered from its rearward end to its feathered forward end a distance, given the speed of rotation, for the article to be received in its forward end and to seat in the rearward end to be withdrawn from the bottom end of the article storage means during rotation, (f) retaining means for retaining the article in place on the feed wheel means during its rotation, (g) deposit means for depositing the article on a sheet on the conveyor means, and (h) drive means for driving the feed wheel means.

2. An apparatus as defined in claim 1, in which:

(i) the groove includes a counterbored hole and the retaining means includes vacuum means applying a suction to the counterbored hole to hold the article in place.

3. An apparatus as defined in claim 2, in which:

(j) the deposit means includes pressure means momentarily applying a pressure to the counterbored hole to urge the article out of place.

4. An apparatus as defined in claim 1, in which:

(i) the arcuate groove formed in said surface includes a counterbored hole defining a stop, said retaining means includes vacuum means applying a suction to the counterbored hole to hold the article in place and said deposit means includes a pressure means momentarily applying a pressure to the counterbored hole to urge the article out of place.

5. An apparatus as defined in claim 3, in which:

(k) the feed wheel means includes an air supply means providing said vacuum means and said pressure means and an air valve means controlling said vacuum means and said pressure means.

6. An apparatus as defined in claim 5, in which:

(l) the feed wheel means includes a shaft, a feed wheel mounted to the shaft and having a rotatable face with an opening, and passage means communicating between said opening and said counterbored hole, and (m) the air valve means is mounted to the shaft in stationary relationship to the feed wheel and includes an elongate arcuate passage connected to a vacuum source and intermittently connected to the opening in the feed wheel face and a smaller passage connected to a pressure source and momentarily connected to the opening in the feed wheel face.

7. An apparatus as defined in claim 6; in which:

(n) the elongate arcuate passage is substantially semi-circular and the smaller passage is disposed in spaced relation from said semi-circular passage on substantially at the same radius.

8. An apparatus as defined in claim 1, in which:

(i) the conveyor means includes a table having opposed support members, (j) the drive means includes a transverse drive shaft carried by the support members, (k) a support frame is mounted to the drive shaft including opposed side members and at least one cross member interconnecting the side members, and (l) said feed wheel means and said storage means are carried by said support means.

9. An apparatus as defined in claim 8, in which:

(m) said feed wheel means includes a shaft carried by said support frame side members, and said side frame members are mounted to the drive shaft in swingable relation to provide adjustment of the feed wheel means relative to the conveyor means.

10. An apparatus as defined in claim 1, in which:

(i) the rotatable feed wheel means includes a removable insert in the form of an attachable-detachable segment of said feed wheel means, the segment having formed therein a groove of a different size.

11. An apparatus as defined in claim 10, in which:

(j) two substantially identical inserts are provided disposed at diametrically opposite locations on the feed wheel.

12. An apparatus as defined in claim 10, in which:

(j) said storage means includes an article storage tube and a storage frame, and (k) said storage frame includes opposed side members and vertically spaced members connected between said members, said spaced members being adapted to receive said storage tube in removable relation.

13. An apparatus as defined in claim 12, in which:

(l) said storage frame spaced members include a removable inner portion adapted to receive said storage tube and are replaceable by a different inner portion adapted to receive a different storage tube.

14. An apparatus as defined in claim 1, in which:

(i) said article storage means includes a tube having a lower end disposed adjacent the rotatable feed wheel means and said tube lower end includes an arcuate cutout portion, and (j) a pivoted resilient arm is mounted to said storage tube having a lower end in part substituting for the tube cutout portion, said arm being movable outwardly from said tube to provide an anti-jamming device.

* * * * *